United States Patent [19]
von Charzewski et al.

[11] Patent Number: 5,019,322
[45] Date of Patent: May 28, 1991

[54] GAS COOLED NUCLEAR REACTOR WITH A PEBBLE BED OF SPHERICAL OPERATING ELEMENTS

[75] Inventors: Cornelia von Charzewski, Maxdorf; Dietrich Leithner, Mannheim; Hermann Schmitt, Winnweiler; Josef Schoening, Hambruecken, all of Fed. Rep. of Germany

[73] Assignee: Hochtemperatur-Reaktorbau GmbH, Dortmund, Fed. Rep. of Germany

[21] Appl. No.: 233,980

[22] Filed: Aug. 19, 1988

Related U.S. Application Data

[63] Continuation of Ser. No. 14,390, Feb. 13, 1987, abandoned.

[30] Foreign Application Priority Data

Feb. 15, 1986 [DE] Fed. Rep. of Germany ....... 3604869

[51] Int. Cl.$^5$ .......................... G21C 1/00; G21G 1/02; G21G 4/02
[52] U.S. Cl. ................................... 376/158; 376/191; 376/214; 376/381
[58] Field of Search ............... 376/214, 156, 158, 191, 376/381, 411, 266, 901, 333, 332, 227

[56] References Cited

U.S. PATENT DOCUMENTS

| | | | |
|---|---|---|---|
| 3,212,989 | 10/1965 | Fitzer et al. | 376/411 |
| 3,321,376 | 5/1967 | Machnig et al. | 376/381 |
| 3,346,462 | 10/1967 | Engel et al. | 376/411 |
| 3,360,477 | 12/1967 | Acree et al. | 376/191 |
| 3,368,979 | 2/1968 | Robkin et al. | |
| 3,438,858 | 4/1969 | Howard et al. | 376/411 |
| 3,523,869 | 8/1970 | Hilborn | 376/214 |
| 3,751,334 | 8/1973 | Sturmer et al. | 376/227 |
| 3,778,295 | 12/1973 | Smith et al. | 376/411 |
| 4,030,974 | 6/1977 | Neef | 376/381 |
| 4,109,153 | 8/1978 | Brachet et al. | 376/191 |
| 4,110,158 | 8/1978 | Maly et al. | 376/381 |
| 4,208,247 | 6/1980 | Impink, Jr. | 376/333 |
| 4,588,547 | 5/1986 | Impink, Jr. et al. | 376/254 |
| 4,597,936 | 7/1986 | Kaae | 376/411 |
| 4,664,871 | 5/1987 | Schoening | 376/381 |
| 4,695,423 | 9/1987 | Teuchert et al. | 376/381 |

FOREIGN PATENT DOCUMENTS

| | | | |
|---|---|---|---|
| 0130227 | 1/1985 | European Pat. Off. | 376/214 |
| 1127504 | 4/1962 | Fed. Rep. of Germany | 376/411 |
| 2735935 | 2/1979 | Fed. Rep. of Germany | . |
| 3047098 | 12/1980 | Fed. Rep. of Germany | . |
| 2925861 | 1/1981 | Fed. Rep. of Germany | 376/332 |
| 3030551 | 3/1982 | Fed. Rep. of Germany | 376/381 |
| 3518968 | 5/1985 | Fed. Rep. of Germany | . |
| 0063588 | 5/1977 | Japan | 376/156 |
| 0050689 | 3/1982 | Japan | 376/156 |

OTHER PUBLICATIONS

Nuclear Engineering, Dec. 1963, pp. 440, 441.
MND-M-1853 (ADD 1), Feb. 1961, Haass et al., pp. III-24, III-28.

*Primary Examiner*—Harvey E. Behrend
*Attorney, Agent, or Firm*—Fulbright & Jaworski

[57] ABSTRACT

A gas cooled nuclear reactor may have a stationary pile of spherical operating elements. The reactor may be controlled and shut down by absorber rods displaceable in channels of the side reflector. The neutron sources required for the safe start-up of such pellet pile reactors, which in the case of higher capacity pile reactors are installed in bores of the side reflector, are arranged in the stationary pile, where they are more effective and do not occupy positions in the side reflector. They may be located in one or more graphite elements having the same diameter as the operating elements. These elements may be introduced and removed into and from the core together with the operating elements and remain stationary in operation.

5 Claims, 2 Drawing Sheets ary of application Ser. No. 014,390 filed Feb. 13, 1987 now abandoned.

GAS COOLED NUCLEAR REACTOR WITH A PEBBLE BED OF SPHERICAL OPERATING ELEMENTS

This application is a continuation of application Ser. No. 014,390 filed Feb. 13, 1987 now abandoned.

BACKGROUND OF THE PRESENT INVENTION

The present invention relates to a gas cooled nuclear reactor with a cylindrical core of a pebble bed of spherical elements (e.g., fuel elements, absorber elements graphite elements), surrounded on all sides by a graphite reflector consisting of top, side and bottom reflectors, and with both trim and shutdown means, consisting of a plurality of absorber rods displaceable in vertical channels of the side reflector.

A nuclear reactor of this type is described in German Application P 35 18 968.1 which corresponds to allowed U.S. application Ser. No. 06/866,921. It is characterized by a compact configuration and simple construction, whereby low energy costs may be obtained. The stationary pile of operating elements enables power operation to be achieved for approximately 10 to 40 years. The operating elements and the absorber rods are then replaced. The nuclear reactor, having a capacity of approximately 10 to 20 MWe, preferably serves as a heating reactor.

For a safe start-up of nuclear reactors, neutron fluxes must be measured with the core in the shutdown state. This requires a neutron source and start-up flux measuring instruments. The neutron source must satisfy two conditions:

the neutron emission of the source (source strength) must be high enough so that 5 pulses per second are registered in the neutron flux detectors of the start-up measuring column;

the distance of the source from the detector must be large enough so that with a multiplication factor of the reactor of 0.99, a maximum of 5% of the neutrons detected in the start-up measuring column come directly from the source.

The first condition guarantees a measuring signal that is adequately statistically accurate, while the second assures that the measuring signal is determined essentially by the core and not by the source.

In the gas cooled nuclear reactor built heretofore with a pebble bed of spherical operating elements, e.g., the THTR-300 MWe (a so-called pellet pile bed reactor), the neutron sources are displaceably positioned in bores of the side reflector. DE-OS 30 47 098 discloses, for example, a transport device for the introduction of a start-up neutron source into the side reflector of a high temperature reactor. This peripheral location of the neutron source in the zone close to the side reflector is neutron-physically disadvantageous and requires high source strengths if the two aforementioned conditions are to be satisfied.

The most favorable location of a neutron source is in the center of the core. However, this optimum position cannot be realized in the THTR-300 MWe and other planned nuclear reactors of this type, as the operating elements which pass through the core once or several times, are circulated in operation. Only during the initial loading of the core, when the operating elements are not yet circulated, may neutron sources be installed temporarily in the core itself. The neutron sources are housed in this case in a rod, which—in a manner similar to the absorber rods for the shutdown of the nuclear reactor—are inserted directly into the pebble bed.

In the case of small bed reactors with a stationary core, in which no absorber rods directly insertable into the pile are provided, the location of neutron sources in bores of the side reflector poses particular problems, as the control and shutdown of these reactors is effected by means of absorber rods displaceable in the side reactor, the so-called reflector rods, and a sufficient number of positions must be available for the reflector rods. The highest possible effectiveness is required of the reflector rods of such a small reactor, in order to be able to bind the excess reactivity necessary for the longest possible service life of the reactor. Long service lives without any addition of fuel make it necessary to locate the highest possible number of reflector rods on the periphery of the reactor core. There is, therefore, no room for neutron sources in the area of the side reflector close to the core.

It is the object of the present invention to locate the neutron sources in a nuclear reactor of the aforementioned type in a manner such that no positions needed for reflector rods are occupied and that simultaneously an effective neutron physical effect is achieved.

SUMMARY OF THE PRESENT INVENTION

In accordance with the present invention there is thus provided a gas cooled nuclear reactor having a pebble bed of operating elements wherein:

(a) the pebble bed contains at least one discrete graphite element containing a neutron emitting substance and which remains stationary in place during operation of the reactor;

(b) the at least one graphite element containing the neutron emitting substance (carrier spheres) have the same diameter as the operating elements;

(c) the introduction into the core of the at least one graphite element containing the neutron emitting substances and its removal from the core are effected together with those of the operating elements.

Compared with the usual arrangement of the neutron sources in pellet pile reactors of higher capacity, the solution proposed herein enables the following advantages to be achieved.

The source strengths necessary for the satisfaction of the aforementioned conditions may be lessened in view of the optimum position of the neutron sources in the core. In the case of neutron sources located directly in the core, practically all of the source neutrons remain in the core, while in the case of neutron sources placed in the side reflector only about one-half of the source neutrons arrive in the core. In addition, the center of the core is much more important from the physical standpoint of a neutron than its periphery. It is therefore possible to use weaker (and thus less expensive) neutron sources for neutron flux measurements during start-up without loss of measuring accuracy.

At the location of the start-up neutron detectors, a more favorable ratio of neutrons from the core to those coming directly from the source is obtained; i.e., the proportion of neutrons originating directly in the source is lower. In the case of neutron sources located in the side reactor, the neutrons emitted by the source may reach the detectors without having traversed the core. With neutron sources arranged in the core, this is not possible, whereby the probability of the multiplication desired of source neutrons in the core by fission is appreciably increased. The second of the aforementioned conditions is thereby automatically satisfied for numerous locations. This provides a significantly greater freedom in the selection of the layout of the start-up instrumentation.

Further, the side reflector does not contain neutron sources, so that a maximum number of reflector rods may be arranged in an optimum manner. An increased shutdown efficiency of the reflector rods may thereby be obtained, which in turn enables longer service lives of the reactor cores to be achieved.

The side reflector may also possess a simpler configuration, as the bores and holders for the neutron sources in the side reflector are eliminated. This has a favorable effect on costs.

No drives are required for the displacement of the neutron sources. The absence of drive and holding means contributes to the fact that the construction of the reactor pressure vessel surrounding the reactor core and the graphite reflector may be rendered simpler and less expensive.

DETAILED DESCRIPTION OF THE PRESENT INVENTION

The present invention will be described in conjunction with the accompanying Figures.

Figure 1:
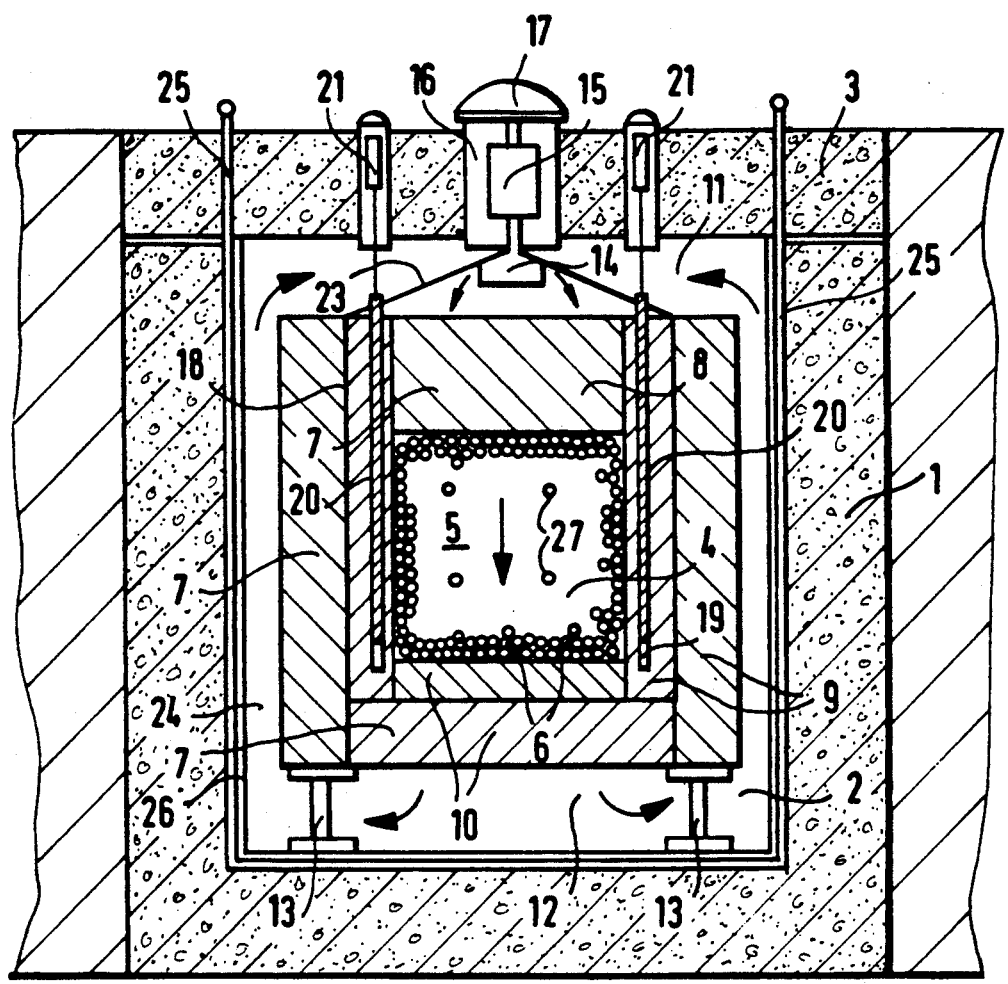
FIG. 1 shows a longitudinal section through a nuclear reactor according to the present invention.

FIG. 1 shows a cylindrical pressure vessel located underground, comprising, for example, a steel reinforced concrete jacket, surrounding a cavity 2. The reactor includes a removable cover 3. In the cavity 2, a nuclear reactor 4 is located, the core of which comprises a pebble bed 5 of spherical operating elements 6 (e.g., fuel elements, absorber elements, graphite el The power density in the core amounts to approximately 2 to 4 $Wcm^3$ and enables a total output of 10 to 20 MWe to be achieved. The bed 5 is surrounded on all sides by a graphite reflector 7, comprising a top reflector 8, a side reflector 9 and a bottom reflector 10.

The top reflector 8 rests directly on the bed 5. A free space 11 is located between it and the cover 3. An additional free space 12 is provided between the bottom reflector and the bottom of the pressure vessel, with a metal support 13 being arranged in the latter space, whereby the nuclear reactor 4 is supported on the bottom of the pressure vessel.

The bed 5 is traversed from top to bottom by a cooling gas, preferably helium, circulated by means of a blower 14. The rotor of the blower is located in the free space 11 and its drive motor is installed in a centrally positioned passage 16 in the cover 3. The passage is provided on its extension with a closure means 17.

The bed 5 is surrounded laterally and below by a steel core vessel 18 which also includes part of the side reflector 9 and the bottom reflector 10 and all of the top reflector 8. The side and the bottom reflectors are therefore divided into inner and outer reflector portions.

Vertical channels 19 are provided in the inner portion of the side reflector 9, wherein a plurality of absorber rods 20 are displaceably arranged for trim and shutdown purposes. The drive means 21 for the absorber rods 20 is installed in the passages 22 of the cover 3.

In the free space 11 a gas conducting jacket 23 is provided to separate the suction and the pressure side of the blower 14. It is connected with the upper end of the core vessel 18. The blower 14 withdraws the cooling gas from the free space 11 and passes it to the bed 5. Subsequent to passage through the reactor the heated cooling gas passes through openings in the core vessel 18 and the bottom reflector 10 and enters the free space 12, where it is distributed and conducted into an annular space 24 from where the gas again enters the space 11.

A cooling system 25 is mounted over the entire inner surface of the pressure vessel 1 consisting of pipes through which cooling water flows and is laid out so that the heat generated in the bed 5 may be safely removed both in power operation and during the removal of decay heat. To prevent the intrusion of water into the primary loop, a gas tight jacket 26 is arranged in the cavity 2 on the reactor side of the cooling system 25, bordering the annular space 24 on the outside.

The core vessel 18 may be removed upwardly, together with the inner parts of the side and bottom reflector 9, 10, the top reflector 8, the operating elements 6 and the absorber rods 20, following the removal of the cover 3. Such a removal operation is carried out after a sufficient burn up of the fuel elements.

For the safe start-up of the nuclear reactor 4, the nuclear reactor is equipped with at least one neutron source and the necessary start-up instrumentation (the latter not shown). The neutron sources are located within the pebble bed 5 of the operating elements and comprise in each case of a discrete graphite element as the carrier element, in which at least one neutron emitting substance is arranged. The graphite elements 27 are preferably spherical in configuration having the same diameter as the operating elements 6. The elements are introduced during the charging of the nuclear reactor 4 together with the operating elements 6 and remain stationary during the operation of the reactor. At the end of the service life of the bed 5, the graphite elements 27 are removed from the nuclear reactor 4 together with the operating elements.

Figure 3:
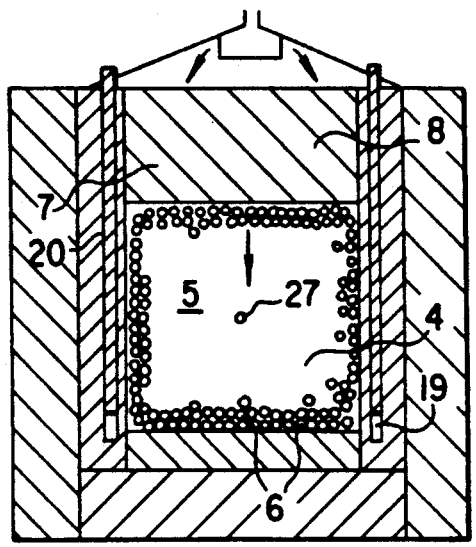
FIG. 3 illustrates a single carrier element centrally positioned in the core.

In the example depicted herein, four graphite elements 27 of low source strength are distributed over the bed 5. It is also possible to provide a single carrier element 27', which then is positioned appropriately in the center of the core (FIG. 3).

Figure 2:
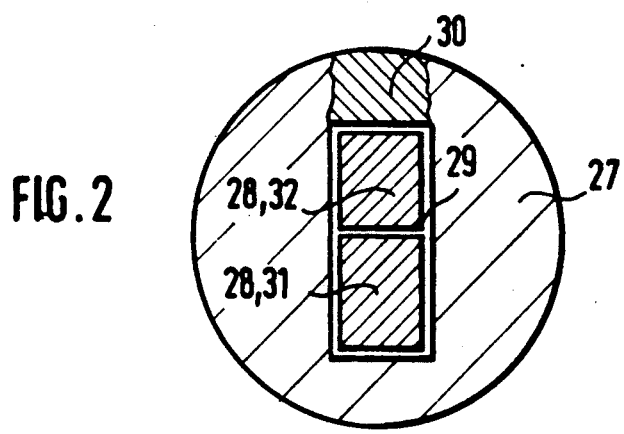
FIG. 2 shows a graphite sphere in cross-section which serves as the carrier for a neutron source.
Figure 4A:
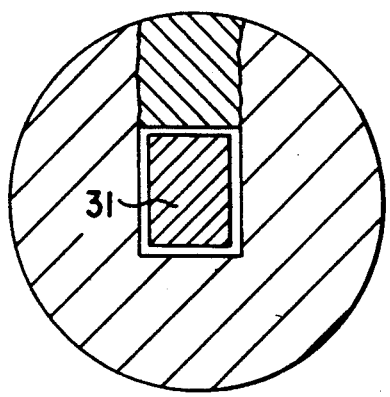
FIG. 4 depicts the use of neutron sources in different carrier elements.
Figure 4B:
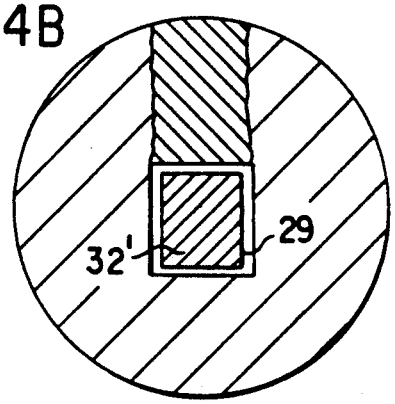

FIG. 2 shows a spherical graphite element 27 greatly enlarged. The graphite sphere 27 comprises in its center a cylinder like cavity 29, sealed by a threaded graphite plug 30. In the cavity 29 two neutron emitting substances 28 are placed, of which 31 is intended for the first core and 32 intended for the operation of the reactor. It is also possible to locate the substance for the first core and that for the reactor operation in different carrier elements (FIG. 4). the first mentioned purpose, for example, the Cf 252 isotope may be used, while for the reactor operation a Sb/Be source activatable in the neutron flux may be employed.

Figure 5:
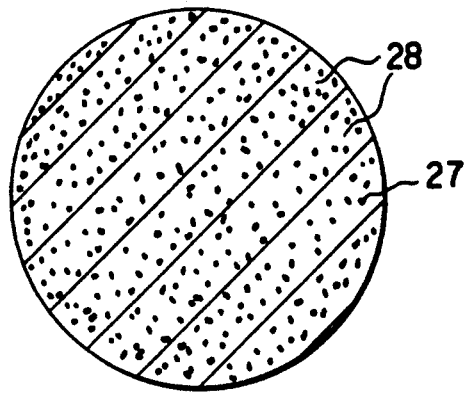
FIG. 5 is a cross sectional view of an element having a neutron emitting substance uniformly distributed within a carrier element.

As an alternative to the neutron sources shown in FIG. 2, in which the neutron emitting substance 28 is present in the form of a compact cylinder, the neutron emitting substance may be finely and uniformly distributed within the graphite matrix of the carrier element (FIG. 5) the production of the element.

What is claimed is:

1. A gas cooled nuclear reactor having a pebble bed of operating elements and no absorber rods directly insertable into said bed of operating rods directly insertable into said bed of operating elements, said reactor comprising:
    a graphite reflector comprised of top, bottom and side reflectors which define the core of said reflector;
    trim and shutdown means comprising a plurality of absorber rods displaceably positioned in vertical channels of said side reflector;
    a pile consisting essentially of spherical pebble operating elements which remain stationary in said core during operating of said reactor, said spherical operating elements include absorber neutron source material activatable in neutron flux;
    wherein said first neutron source material is located within a spherical graphite neutron source element and said second neutron source material is located within a spherical graphite neutron source element.

2. A nuclear reactor according to claim 1 wherein said operating elements include only a single discrete graphite neutron source element containing said first neutron source material and said second neutron source material located in the center of said core.

3. A nuclear reactor according to claim 1 wherein said operating elements include only four discrete graphite neutron source elements.

4. A nuclear reactor according to claim 1 wherein said first neutron source material emitting neutrons at a neutron flux sufficient for start-up of said reactor is of Cf-252.

5. A nuclear reactor according to claim 4 wherein said second neutron source material further comprises antimony and beryllium.

* * * * *